US009455631B2

(12) United States Patent
Feldtkeller

(10) Patent No.: US 9,455,631 B2
(45) Date of Patent: Sep. 27, 2016

(54) CURRENT ESTIMATION FOR A CONVERTER

(71) Applicant: Infineon Technologies Austria AG, Villach (AT)

(72) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 248 days.

(21) Appl. No.: 14/019,781

(22) Filed: Sep. 6, 2013

(65) Prior Publication Data

US 2015/0069990 A1 Mar. 12, 2015

(51) Int. Cl.
*G05F 1/00* (2006.01)
*H02M 3/158* (2006.01)
*H02M 1/00* (2006.01)

(52) U.S. Cl.
CPC ..... *H02M 3/158* (2013.01); *H02M 2001/0009* (2013.01)

(58) Field of Classification Search
CPC ... H02M 3/1588; H02M 3/156; H02M 3/157
USPC .......................................... 323/271, 282–286
See application file for complete search history.

(56) References Cited

U.S. PATENT DOCUMENTS

| 6,222,356 | B1 | 4/2001 | Taghizadeh-Kaschani |
| 6,909,268 | B2 | 6/2005 | Taghizadeh-Kaschani |
| 7,298,122 | B2 | 11/2007 | Bernacchia et al. |
| 2001/0046145 | A1 | 11/2001 | Oknaian et al. |
| 2005/0127888 | A1 | 6/2005 | Marschalkowski et al. |
| 2005/0206358 | A1 | 9/2005 | Van Der Horn et al. |
| 2006/0044843 | A1 | 3/2006 | Oswald et al. |
| 2008/0203992 | A1 | 8/2008 | Qahouq et al. |
| 2009/0267582 | A1 | 10/2009 | Prodic et al. |
| 2010/0026262 | A1 | 2/2010 | Sase et al. |
| 2012/0078556 | A1 | 3/2012 | Holmberg et al. |
| 2012/0161729 | A1 | 6/2012 | Tong et al. |
| 2012/0313646 | A1 | 12/2012 | Nishikawa |
| 2015/0069990 | A1* | 3/2015 | Feldtkeller ............ H02M 3/158 323/284 |

FOREIGN PATENT DOCUMENTS

| CN | 1659771 A | 8/2005 |
| CN | 101252311 A | 8/2008 |
| CN | 102016742 A | 4/2011 |
| CN | 102426284 A | 4/2012 |
| CN | 102566732 A | 7/2012 |
| CN | 102577061 A | 7/2012 |
| CN | 103267891 A | 8/2013 |

* cited by examiner

*Primary Examiner* — Nguyen Tran

(74) *Attorney, Agent, or Firm* — Slater Matsil, LLP

(57) ABSTRACT

A embodiment relates to a current estimation circuitry for a converter comprising: an integrator for integrating a voltage across an inductor of the converter; a current sense unit for obtaining a signal that is associated with the current flowing through at least one of the electronic switches of the converter; and a control unit for adjusting at least two parameters of the integrator based on comparing the output of the integrator with the signal provided by the current sense unit.

35 Claims, 8 Drawing Sheets

CURRENT ESTIMATION FOR A CONVERTER

BACKGROUND OF THE INVENTION

Embodiments relate to current estimation and allows for such current estimation in converter circuits that operate at high switching frequencies.

SUMMARY

A first embodiment relates to a current estimation circuitry for a converter comprising:
  an integrator for integrating a voltage across an inductor of the converter,
  a current sense unit for obtaining a signal that is associated with the current flowing through at least one of the electronic switches of the converter,
  a control unit for adjusting at least two parameters of the integrator based on comparing the output of the integrator with the signal provided by the current sense unit.

A second embodiment relates to a method for current estimation for a converter comprising the steps:
  integrating via an integrator a voltage across an inductor of the converter,
  obtaining a signal that is associated with the current flowing through at least one of the electronic switches of the converter,
  adjusting at least two parameters of the integrator based on comparing the output of the integrator with the signal provided by the current sense unit.

A third embodiment relates to a system for current estimation for a converter comprising:
  means for integrating via an integrator a voltage across an inductor of the converter,
  means for obtaining a signal that is associated with the current flowing through at least one of the electronic switches of the converter,
  means for adjusting at least two parameters of the integrator based on comparing the output of the integrator with the signal provided by the current sense unit.

A forth embodiment is directed to a DC/DC buck converter comprising a current estimation circuitry as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
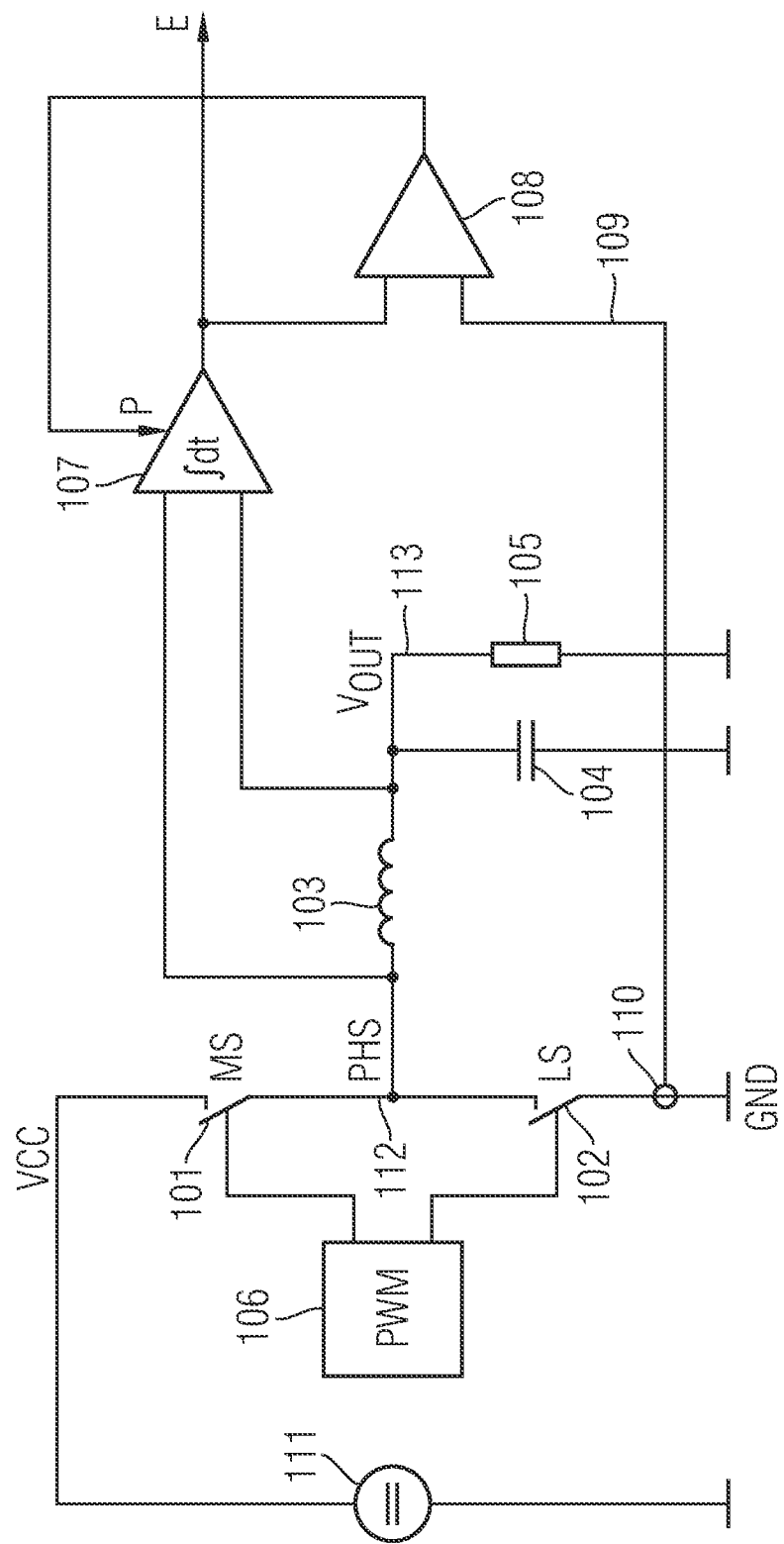
FIG. 1 shows a switching buck DC/DC converter with a DC source, a high-side switch, a low-side switch, an inductor, an output capacitor and a resistor, wherein an integrator integrates a voltage across the inductor and outputs an estimated current signal E based on this integration and wherein a comparator compares the estimated current signal E with a signal, which is obtained from sensing a current through the low-side switch.

The circuitry described in greater detail can be part of a converter, processing device or control device of any kind which may be connected, connectable to or comprising such converter. However, it is noted that there is no limitation to use the disclosed circuitries.

The solution presented herein may in particular relate to a buck type DC/DC converter. Such a converter can be used, e.g., on a computer mainboard for power supply of a central processing unit (CPU) or in combination with a load voltage regulator.

There is an increasing demand for a high operation frequency (switching frequency) of such DC/DC converter. Actual mainboards use an operation frequency amounting to 500 kHz, a next generation operation frequency may be up to 1 MHz and subsequent generations may target an operation frequency amounting to 3 MHz and beyond.

The converter referred to herein may in particular be a DC/DC (switching) converter or any power converter comprising at least one half-bridge or full-bridge circuit, each further comprising electronic switches, e.g. semiconductor-switches, transistors, MOSFETs, IGBTs, etc.

In DC/DC converters, energy is periodically stored into and released from a magnetic field in an inductor or a transformer. By adjusting the duty cycle of the charging voltage (that is, the ratio of on/off time), the amount of power transferred can be controlled. Usually, this is applied to control the output voltage, though it could be applied to control the input current, the output current, or maintain a constant power. Transformer-based converters may provide isolation between the input and the output.

For example, CPU or chipset power supplies use multi-phase DC/DC converters. For current balancing purposes the load current of each phase may have to be known or determined with high accuracy.

For a load step response it is also beneficial to know the current in real time, which may include the current ripple and in particular more information than only an average value of the current. A real time current information may be used for controlling a discontinuous conduction mode (DCM) control, e.g., during low load conditions.

The examples suggested herein in particular show how to efficiently generate a high precision real time current monitoring signal also up to a high operation frequency of a converter, e.g., in the order of up to 3 MHz and beyond.

The described current estimator may also be used in the field of DC/DC converters for LEDs, where an accurate information about the LED current is required, but cannot be sensed directly.

Examples described herein may in particular utilize an integration of a voltage across a coil (also referred to as inductor) of a converter, in particular a DC/DC converter, e.g., buck converter, to determine (an image of) the current. A current sense functionality can be used, preferably implemented as a sense cell in one of the half bridge switches of the converter and preferably in the switch which is in a conductive state most of the time. The switch may be a high-side switch or a low-side switch of the converter.

The results from the sense cell current measurement may be compared with the image of the current obtained by integration. The comparison may be used to adjust two parameters of the integrator so that the image matches the sensed current during such times, while the sensed current is assumed to be valid. The parameters may preferably be an integrator gain and an offset.

According to an option, the current source which drives the current through the sense cell may not be controlled by a current sense operational amplifier, but by a tuned integrator output and the parameters may be adjusted based on the current sense operational amplifier's output signal. This modification to the hierarchical structure of feedback loop allows the circuit to operate at high frequencies maintaining a suitable level of accuracy.

FIG. 1 shows a switching buck DC/DC converter with a DC source 111, a high-side switch 101, a low-side switch 102, an inductor 103, an output capacitor 104 and a resistor 105 (load).

The DC source 111 is connected across the switch 101 to a node 112 and the node 112 is connected across a series connection comprising the switch 102 and a current detector 110 to ground GND. The node 112 is connected via the inductor 103 to a node 113. The node 113 is connected via the capacitor 104 to ground GND. Also, the node 113 is connected via the resistor 105 to ground GND.

A switching signal of the converter (also referred to as PHS signal) can be determined at the node 112 and a voltage VOUT can be determined at the node 113.

A PWM generator 106 (PWM: pulse width modulation) drives the switches 101 and 102 in alternating order. An integrator 107 integrates the voltage across the inductor 103 and outputs an estimated current signal E based on this integration.

A comparator 108 compares the estimated current signal E with a signal 109, which is obtained from sensing a current through the low-side switch 102. The signal 109 can be obtained from the current detector 110, which could be realized as a sense resistor or the like. The output of the comparator 108 is fed back to a configuration input of the integrator 107 (signal P). The comparator 108 can be any generic comparator or any circuitry providing a comparing functionality.

Figure 2:
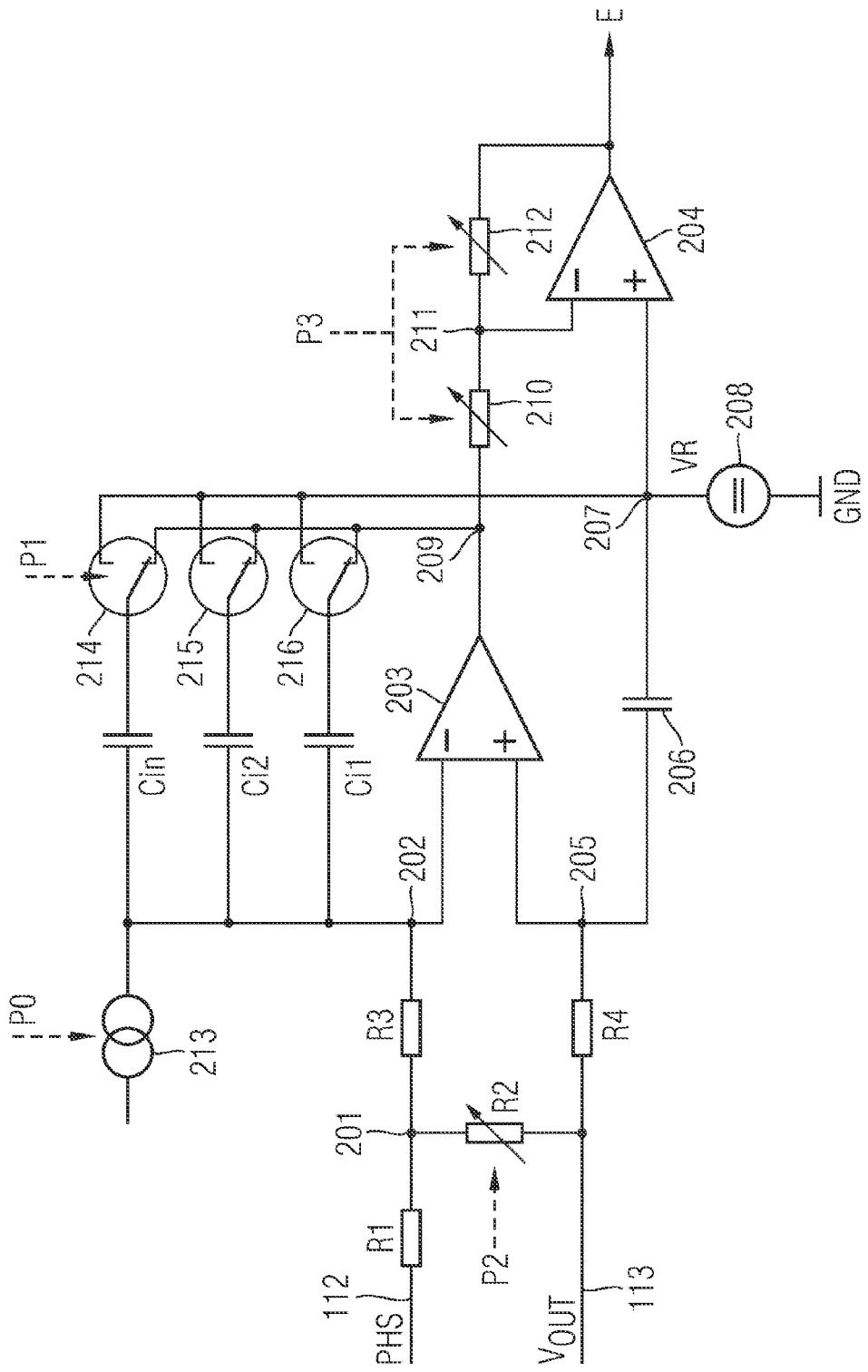
FIG. 2 shows an exemplary implementation of the integrator with configurable parameters gain and offset.

FIG. 2 shows an exemplary implementation of the integrator 107 with configurable parameters gain and offset.

The node 112 is connected via a resistor R1 to a node 201, the node 201 is connected via a resistor R3 to a node 202. The node 113 is connected via a variable resistor R2 to the node 201. Also, the node 113 is connected via a resistor R4 to a node 205. The node 202 is connected to the inverting input of an operational amplifier 203 and the node 205 is connected to the non-inverting input of the operational amplifier 203.

The node 205 is connected via a capacitor 206 to a node 207. The node 207 is connected via a DC source 208 to ground GND. The node 207 is connected to the non-inverting input of an operational amplifier 204. The output of the operational amplifier 204 provides the estimated current signal E.

The output of the operational amplifier 203 is connected to a node 209. The node 209 is connected via a variable resistor 210 to a node 211 and the node 211 is connected via a variable resistor 212 to the output of the operational amplifier 204.

A controllable current source 213 is connected to the node 202. The node 202 is connected via a capacitor Cin to a switch 214, the node 202 is connected via a capacitor Ci2 to a switch 215 and the node 202 is connected via a capacitor Ci1 to a switch 216. Each of the switch 214, 215 or 216 is a controllable switch which connects its associated capacitor Cin, Ci2, Ci1 either to the node 209 or to the node 207. According to this scheme a number of n capacitors with controllable switches can be provided.

The current source 213 may be used to adjust an offset by adding a variable current to the input of the integrating operational amplifier 203. The current of the current source may be controlled by a parameter P0.

According to the exemplary circuitry of FIG. 2, the integrator gain can be modified in three different ways. Each modification can be used as such or at least two of the modifications may be combined in order to adjust the integrator gain.

A parameter P1 controls the switches 214 to 216. Hence, the parameter P1 allows connecting the capacitors Cin, Ci2, Ci1 (which are in the feedback loop of the operational amplifier 203), either to the output of the operational amplifier 203 or to the DC source 208. The DC source 208 serves as a reference voltage, which may be the initial level of the integrator output when the inductor current is zero.

The multiple switches 214 to 216 can be controlled in a binary code or in a thermometer code manner.

A parameter P3 controls at least one of the variable resistors 210, 212. Hence, the parameter P3 controls the gain of the operational amplifier 204 (post-amplifier).

A parameter P2 controls the variable resistor R2. This allows modifying a pre-attenuator gain at the entry of the operational amplifier 203 (integrator).

If during operation, when some voltage-time-area has accumulated in the integrator that corresponds to a current flowing through the inductor, the parameter P2 is changed, it influences only the gain how a voltage-time-area is converted into the estimated current after the modification. The actual integrator content remains unchanged.

If the parameter P1 or P3 is changed during operation, the gain of the complete voltage-time-area that has been accumulated in the integrator is affected. Hence, the estimated current signal will change immediately to a value as if the gain would have been initially set to this changed value.

The different influences of the parameter settings can be used as follows:
(a) During start up, when the integrator gain is assumed to be wrong, the gain may be adjusted by modifying the parameters P1 and/or P3. This will lead to a faster setting of the gain loop.
(b) Once the gain is correctly set during operation, it may be subject to temperature drifts. Hence, the gain may needs to be re-calibrated, e.g., via the parameter P2.

Figure 3:
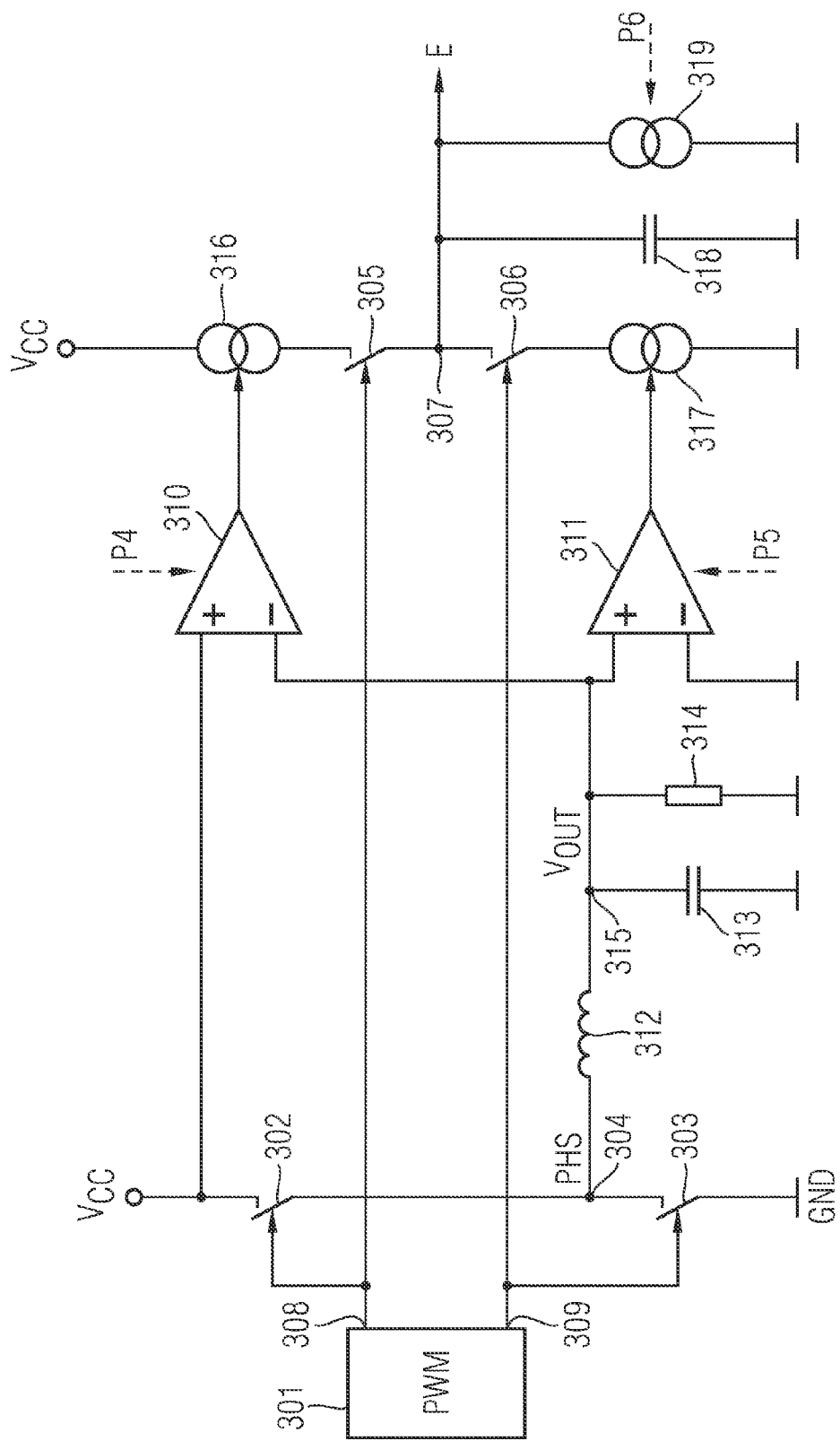
FIG. 3 shows another example of a different implementation of the integrator and its connections to the DC/DC converter.

FIG. 3 shows another example of a different implementation of the integrator and its connections to the DC/DC converter.

A PWM generator 301 controls switches 302, 303, 305 and 306, wherein the switches 302 and 305 are controlled via an output 308 and the switches 303 and 306 are controlled via an output 309 of the PWM generator 301 in an alternating order. A DC source with a supply voltage VCC is connected via the switch 302 to a node 304 and the node 304 is connected via the switch 303 to ground GND. The supply voltage VCC is also connected to the non-inverting input of an operation amplifier 310, the inverting input of the operational amplifier 310 is connected with the non-inverting input of an operational amplifier 311 and the inverting input of the operational amplifier 311 is connected to ground GND. A switching signal of the converter, also referred to as PHS signal, can be obtained at the node 304.

The output of the operational amplifier 310 controls a current source 316 and the output of the operational amplifier 311 controls a current source 317. The supply voltage VCC is connected via the current source 316 and the switch 305 to a node 307 and the node 307 is connected via the switch 306 and the current source 317 to ground GND.

The node 307 is connected via a capacitor 318 to ground GND. Also, the node 307 is connected via a current source 319 to ground GND. The node 307 provides the estimated current signal E.

The node 304 is connected via an inductor 312 to a node 315. The node 315 is connected via a capacitor 313 to ground GND. Also, the node 315 is connected via a resistor 314 to ground GND. The node 315 is further connected to the non-inverting input of the operational amplifier 311

The implementation according to FIG. 3 in particular assumes ideal switches. While the high-side switch 302 is closed, the integration capacitor 313 is charged with a current that is proportional to the voltage VCC-VOUT, wherein VOUT is the voltage at the node 315. While the low-side switch 303 is closed, the capacitor 313 is discharged with a current that is proportional to the voltage VOUT, i.e. the voltage at node 315.

A parameter P4 is used to control the operational amplifier 310, i.e. to affect the positive half-wave and a parameter P5 is used to control the operational amplifier 311, i.e. to affect the negative half-wave. The current source 319 may be used to adjust an offset via a parameter P6.

Examples for correction parameters are:
A transconductance of the charge current source and a transconductance of the discharge current sink;
A transconductance of both currents in parallel and a constant leakage current parallel to the capacitor;
A transconductance of the charge current source and current value of the discharge current.

FIG. 4 visualizes steps of a method to determine gain and offset correction from a sensed current and an estimated current signal. FIG. 4 may be based on the embodiments shown in, e.g., FIG. 1 and FIG. 2.

Figure 4A:
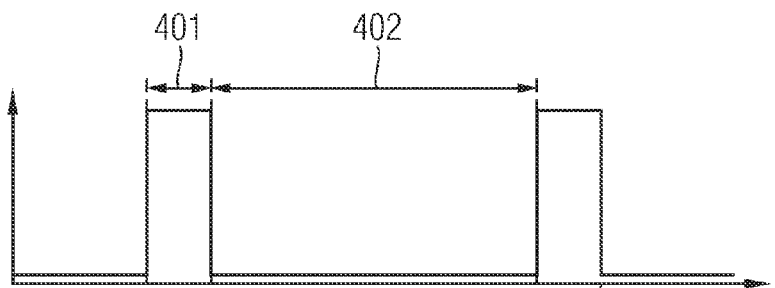
FIGS. 4*a*-4*f* illustrate a method to determine gain and offset correction from a sensed current and an estimated current signal.

FIG. 4a shows the switching of the converter, namely a PHS signal. During a duration 401, the high-side switch is closed and the low-side switch is open and during a duration 402, the high-side switch is open and the low-side switch is closed.

Figure 4B:
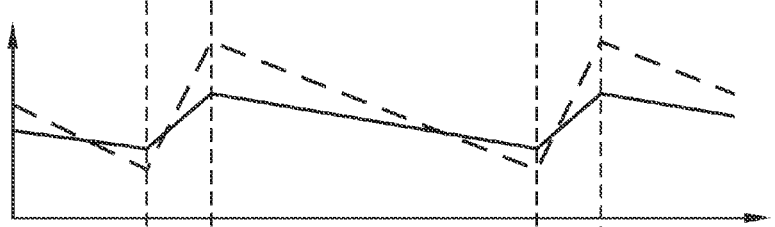

FIG. 4b shows a corresponding waveform of an inductor current, i.e. a current through the inductor 103, which may not be directly available and may thus have to be determined. A dashed line also shows an example for an estimated current waveform before the parameter adjustment loop has been adjusted.

Figure 4C:
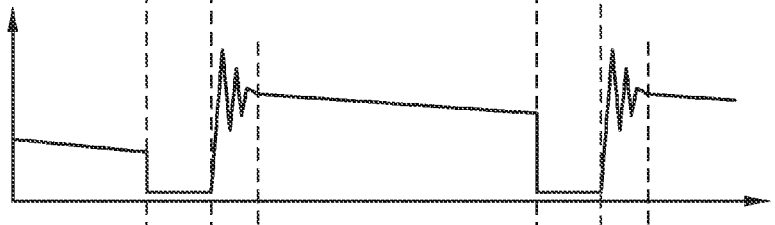

FIG. 4c shows a waveform that is available from the current detector 110. While the low side switch is off and the signal PHS is high, there is no signal available, or the signal is zero.

When the low side switch turns on at a time t1, the current sensor loop first has to settle, additionally there may be some ringing on the actual low-side current. During the settling and ringing time, i.e. between the time t1 and a time t2, the current sense signal may be invalid and therefore may preferably not be used.

After some delay after and after the low-side switch has been turned on, the ringing subsides and the current sense loop reaches a stable state thereby producing a signal that can be deemed valid. Such validity period starts at the time t2 and may continue until a time t4, prior to the low-side switch being switched off (again).

The time t4 can be derived from the control signal of the PWM generator switching off the low-side switch. There may also be some signal delay from the control signal to the actual switching event.

Figure 4D:
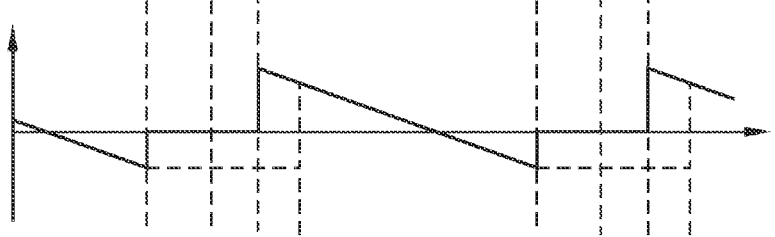

FIG. 4d shows as a graph with a solid line representing a signal which is derived by subtracting the sensed current signal from the estimated current signal. Furthermore this signal is masked (faded out) while the current sense signal is deemed invalid (because of the instability discussed above). The masking is an optional feature, which may reduce the settling time after the current sense signal has become valid.

FIG. 4d also shows a graph with a dashed line representing a signal derived from the solid signal by track and hold. Such tracking may start at a time t3, which may have some delay added to the time t2, and it stops at the time t4. If the track and hold signal deviates from the solid signal before the tracking begins, which is between the time t2 and the time t3, there is a deviation between the ripple of the estimated current and the real current. Hence, the signal difference across the track and hold stage is a measure for the gain error of the integrator and can be used to adjust the gain from cycle to cycle.

The difference between the sensed current and the estimated current while the current sense signal is valid is a measure for an offset of the estimated current against the actual current. From t3 to t4 any of the signals shown in FIG. 4d can be used to adjust the integrator offset. Any such signal can be sampled any time between the time t3 and the time t4, or an average value in an interval between the time t3 and the time t4 can be used.

As a modification of the integrator offset may have an impact on the estimated signal, an offset control loop may have a PI behavior with a large P (proportional) and small I (integrating) component for loop stability purposes.

Beneficially, when both the gain and the offset loops are settled, both signals shown in FIG. 4d may advantageously be zero at all time.

Figure 4E:
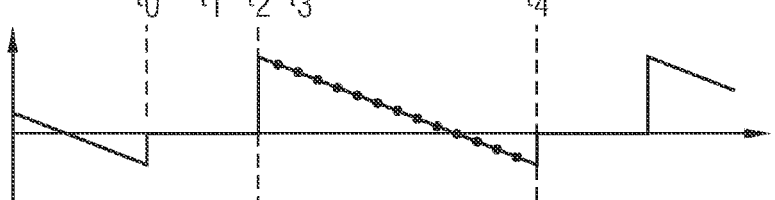

As an option and/or an alternative, the control parameters may be derived by sampling the difference between the estimated current and the sensed current while the sensed signal is valid (as indicated in FIG. 4e between the time t2 and the time t4) with an analog-to-digital converter and to (e.g., mathematically) determine an average and the slope after the sampling is completed.

Figure 5:
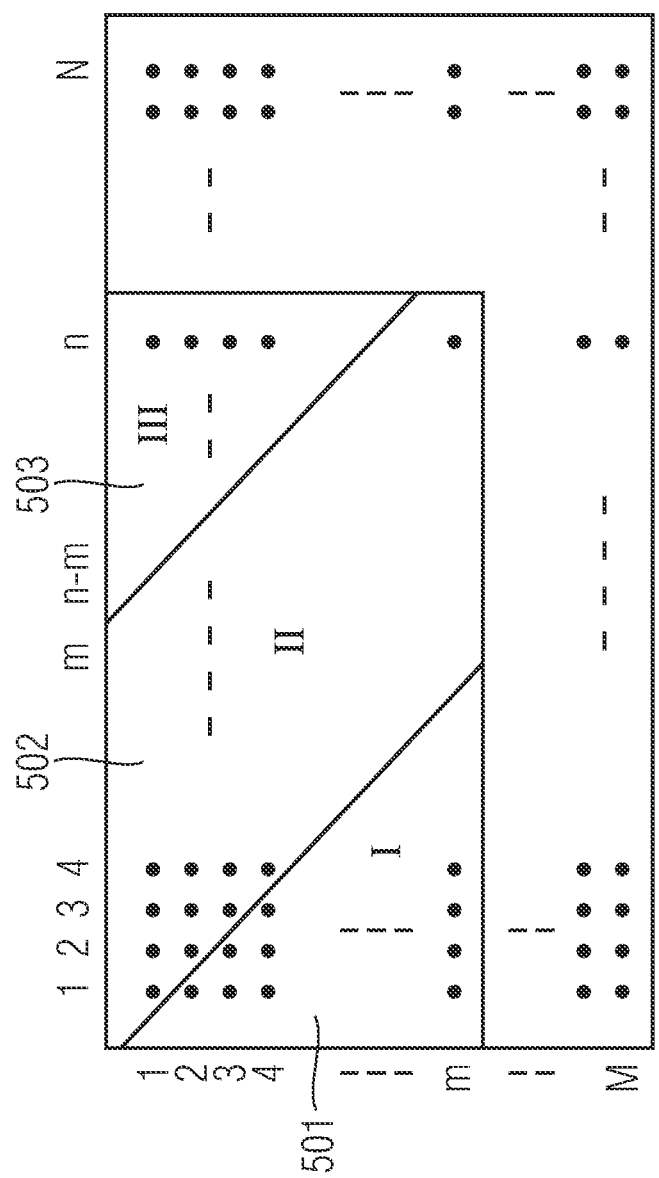
FIG. 5 shows another approach to derive control parameters from a plurality of samples via an array of sampling capacitors.

FIG. 5 shows yet another approach to derive control parameters from a plurality of samples via an array of sampling capacitors. The array has N columns and M rows, where N=2*M. Each element of the matrix can be realized by at least one capacitor.

With each sample the capacitors of one column are charged to the corresponding value of the sample at a time. Therefore the maximum sample length is N samples. The sampling stops when N samples are taken or at the time t4, whichever comes first.

It is assumed that at the time t4, n samples are stored with n<N. From the M rows, m rows are used, with m=n/2. If n is an odd number, m is rounded up to the next integer. The array can now be divided into three regions. A first region 501 includes all capacitors below a diagonal from x=0, y=0 to x=m, y=m. A third region 503 includes all capacitors above a diagonal from x=n-m, y=0 to x=n, y=m. All remaining capacitors between the two diagonals belong to a second region 502.

Figure 4F:
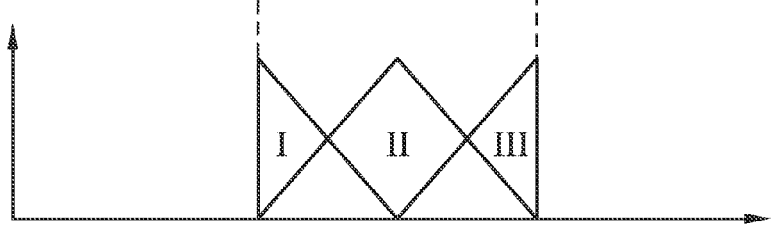

Next, all capacitors of each region 501 to 503 are switched in parallel. When the charges are equalized, the resulting voltage for each region is a weighted average of a plurality of samples. Weight functions are shown in FIG. 4f. The weighted average obtained in the second region can be used to correct the integrator offset, the difference between the first and third regions can be used for correcting the gain.

During DCM operation at low load the turn on time of the low-side switch may be too short for a correct operation of the gain control loop. If the current ripple gets lower, errors within the loop may increase compared to the ripple, which may detune the gain setting. If the load then increases again, the gain may be incorrect in the beginning leading to a wrong estimate current. Hence, the gain may be re-adjusted over some cycles. Advantageously, the gain correction loop can be deactivated during DCM operation. A criterion for deactivating the gain correction loop may be the length of the dead time (when both switches are off), the length of the turn on time of the low-side switch and/or the duty cycle of the turn on time of the low-side switch compared to the duration of the period (also referred to as cycle). When the gain correction loop is deactivated, the last gain setting that was obtained during continuous conduction mode (CCM) operation can be frozen and may not be changed until the converter returns to CCM operation.

If there is no or only low load attached, it is an option to conduct no switching, e.g., for several cycles. In this case, the offset control loop may remain closed to avoid that a small amount of offset error integrates up over time to a large error of the estimated current. Without the low-side switch being closed for a long time, there is no valid current information available.

In such case the offset loop may be closed in a different way. While both switches are open, the inductor current reaches zero after some time. The estimated current signal is then used directly to control the offset, because it should be zero. A criterion to switch the offset control loop from CCM mode to a tri-state mode can be the length or the duty cycle of the tri-state periods in relation to the switching cycle.

Figure 6:
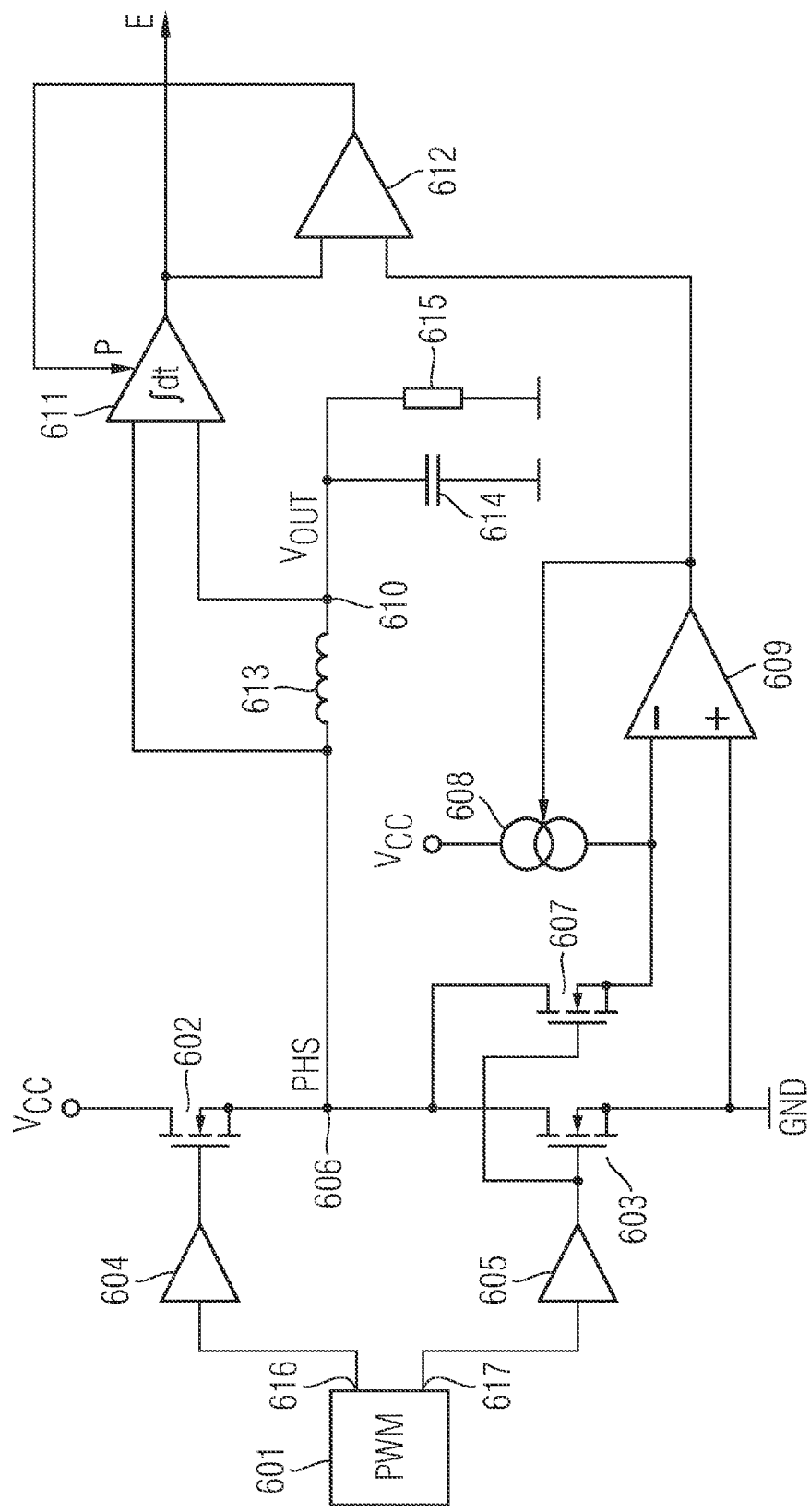
FIG. 6 shows an implementation of a switching converter with a current estimator as comprising a particular embodiment of a current sensing circuit.

FIG. 6 shows an implementation of a switching converter with a current estimator as described above comprising a particular embodiment of a current sensing circuit.

A PWM generator 601 drives the switches 602 and 603 via drivers 604, 605 in an alternating order via its outputs 616 and 617.

A DC source provides a supply voltage VCC, which is connected via the switch 602 to a node 606. The node 606 is connected via the switch 603 to ground GND. The switches 602 and 603 as well as a switch 607 can be realized as n-channel MOSFETs.

Hence, the supply voltage VCC is connected to the drain of the switch 602 and the source of the switch 602 is connected to the node 606. The node 606 is connected to the drain of the switch 603 and the source of the switch 603 is connected to ground GND. The gate of the switch 602 is controlled via the driver 604 and the gate of the switch 603 is controlled via the driver 605.

The gate of the switch 603 is connected with the gate of the switch 607 and the drain of the switch 603 is connected with the drain of the switch 607. The source of the switch 607 is connected to the inverting input of an operational amplifier 609. The inverting input of the operational amplifier 609 is connected to ground GND. The non-inverting input of the operational amplifier 609 is further connected via a current source 608 to the supply voltage VCC, wherein the current source 608 is controlled via the output of the operational amplifier 609. The output of the operational amplifier 609 is also connected to one input of a comparator 612.

The switching signal of the converter (PHS signal) can be determined at the node 606. The node 606 is connected via an inductor 613 to a node 610. The voltage VOUT can be determined at the node 610. The node 610 is connected via a capacitor 614 to ground GND; also, the node 610 is connected via a resistor 615 (load) to ground GND.

One input of an integrator 611 is connected with the node 606 and the other input of the integrator 611 is connected with the node 610. Hence, the integrator 611 integrates the voltage across the inductor 613 and outputs the estimated current signal E based on this integration. The output of the integrator 611 is connected to another input of the comparator 612 and the output of the comparator 612 is fed back to a configuration input of the integrator 611 (indicated as signal P). The comparator 612 can be any generic comparator or any circuitry providing a comparing functionality, as described along with FIG. 4b to FIG. 4d.

Hence, according to the example shown in FIG. 6, the low-side switch 603 has a sense cell, i.e. the switch 607, which is connected in parallel except for the their source connections. The inputs of the operational amplifier 609 are connected to the source connectors of the low-side switch 603 and the sense cell, i.e. the switch 607. The output of the operational amplifier 609 controls the current source 608, which feeds its current into the source of the sense cell, i.e. the switch 607. The inputs of the operational amplifier 609 are balanced in case a voltage drop across the switch 607 equals a voltage drop across the switch 603. A ratio of the load current to the current of the current source 608 may then equal the conductivity ratio of the switch 603 compared to the switch 607, which may be predictable and determined by a design of the switch 603 and the sense cell, i.e. said switch 607.

The output signal of the current sense circuit is supplied at the output of the operational amplifier 609 and is also used to control the current source 608. This output signal is valid when the inputs of the operational amplifier 609 are balanced, i.e. when the control loop including the operational amplifier 609 and the current source 608 have reached a substantially stable state.

In case the switch 607 (sense cell) and the operational amplifier 609 are not on the same chip, a time until such stable state is reached may not only depend on the design of the operational amplifier 609 and the current source 608, but also on parasitic effects like bond wire inductance and coupling capacitances. On the other hand, such settling time of the current sense circuit may determine a delay between the time t1 and the time t2 according to FIG. 4 and may therefore put an unwanted effect or limit on the switching frequency of the converter.

Figure 7:
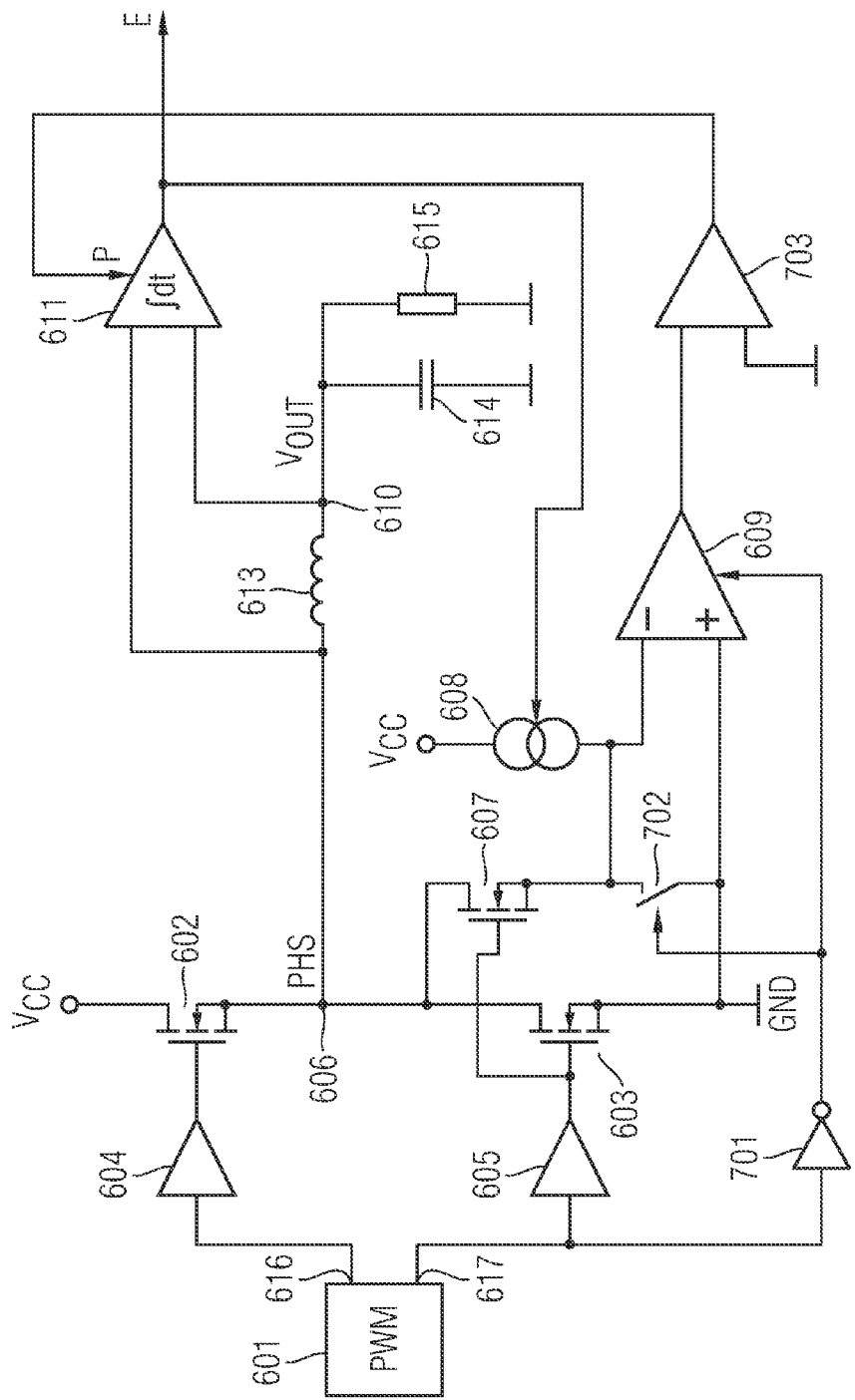
FIG. 7 shows an implementation of a switching converter with a current sensing circuit based on FIG. 6, which may be operable at high converter frequencies.

FIG. 7 shows an implementation of a switching converter based on FIG. 6, which may be operable at high converter frequencies.

The circuitry shown in FIG. 7 is based on the diagram of FIG. 6. In contrast to FIG. 6, the output 617 is connected to the driver 605 and to an inverter 701, wherein the output of the inverter controls a switch 702 and the operational amplifier 609. The switch may be any electronic switch, e.g., a MOSFET, which allows—based on the control via the inverter 701 to short-circuit the two inputs of the operational amplifier 609.

Also in contrast to FIG. 6, the output of the operational amplifier 609 is only connected to one input of a comparator 703, wherein the other input of the comparator 703 is connected to ground GND. The output of the comparator 703 is fed back to a configuration input of the integrator 611 (indicated as signal P).

The current source 608 is controlled by the output of the integrator 611 that estimates the signal E. A voltage difference between the source connectors of the switch 603 and the switch 607 (sense cell) is amplified by the operational amplifier 609, which can be realized as a wideband differential amplifier. This operational amplifier 609 may not require a precise gain and may therefore be arranged as a non-feedback amplifier.

A signal inverse to the control signal of the low-side switch 603 is supplied by the inverter 701 and controls the switch 702, which short-circuits the inputs of the operational amplifier 609 and may optionally gate the operational amplifier 609 internally. Thus when the low-side switch 603 is turned on, the inputs of the operational amplifier 609 are initially balanced and the output is zero. If the estimated current signal E does not correspond to the load current, the voltage drop across the switch 607 (sense cell) is different from the voltage drop across the switch 603 and a differential voltage appears across the inputs of the operational amplifier 609 when the switch 702 is opened.

The output signal of the operational (wideband differential) amplifier 609 is then further processed as described in correspondence with FIG. 4d.

Once the parameter control loop has reached a steady state, the output of the operational amplifier 609 does not have to settle, because there may be no excursion at all. In such case, the voltage at the source of the switch 603 and at the source of the switch 607 are the same and the inputs of the operational amplifier 609 are balanced. This embodiment allows for a high operational (switching) frequency of the DC/DC converter.

Figure 8:
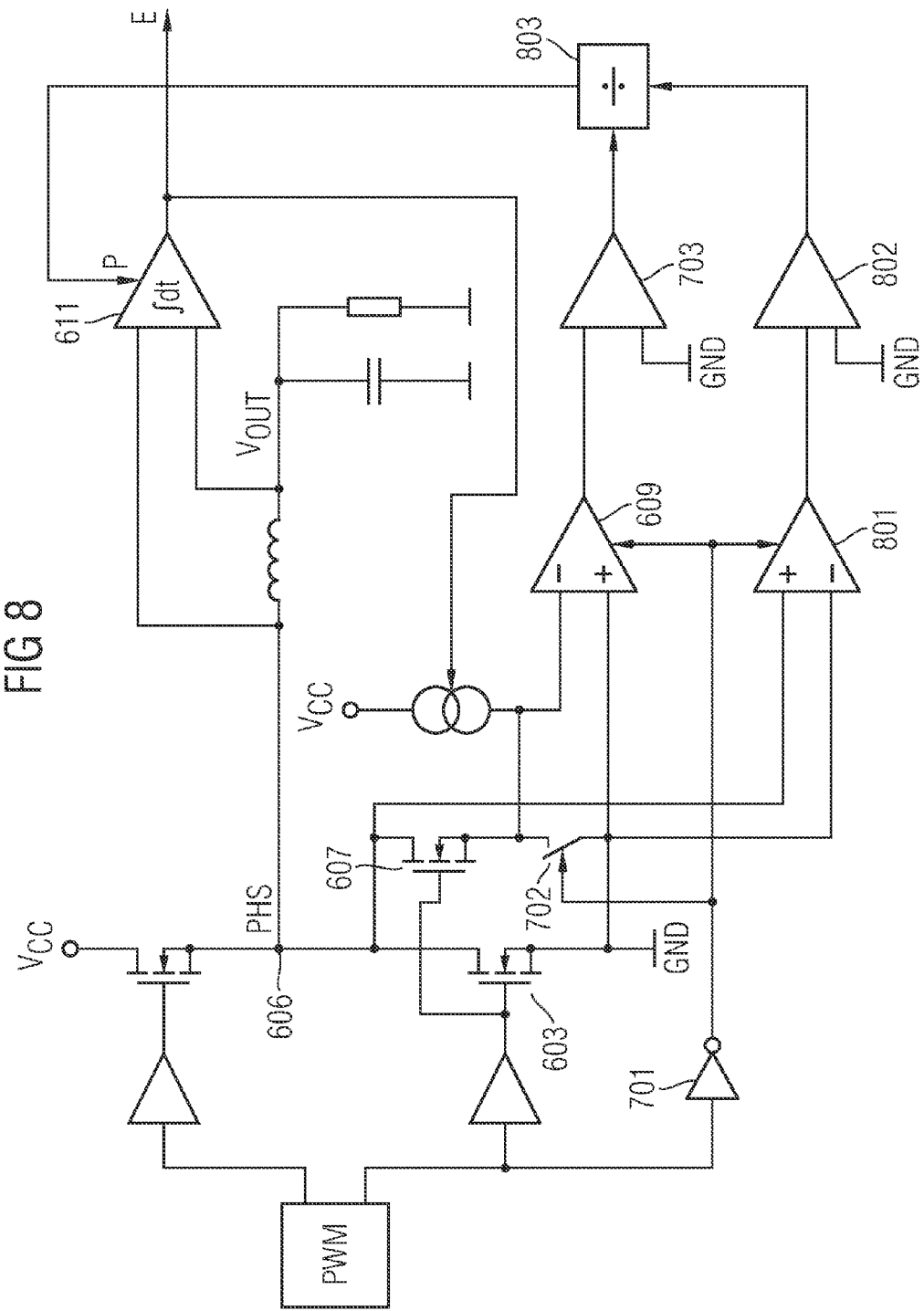
FIG. 8 shows another embodiment of a switching converter with a current sensing circuit based on FIG. 7.

FIG. 8 shows another embodiment based on FIG. 7. In addition to FIG. 7, an operational amplifier 801 is supplied with its inputs connected across the series connection comprising the switch 607 (sense cell) and the switch 702. Hence, the noninverting input of the operational amplifier 801 is connected to the node 606 and the inverting input of the operational amplifier 801 is connected to ground GND. The output of the inverter 701 may be used to also control the operational amplifier 801, e.g., to optionally gate the operational amplifier 801 internally.

The output of the operational amplifier 801 is only connected to one input of a comparator 802, wherein the other input of the comparator 802 is connected to ground GND. The output of the comparator 802 is connected to a division unit 803.

In contrast to FIG. 7, the output of the comparator 703 is connected to the division unit 803. The output of the division unit 803 is fed back to the configuration input of the integrator 611 (indicated as signal P).

The division unit 803 may be realized using at least one analog-to-digital and/or at least one digital-to-analog converter thereby providing a scaling by dividing the output of the comparator 703 by the output of the comparator 802. The output of the comparator 802 supplies a reference signal based on the switching signal PHS of the converter. Advantageously, the solution according to FIG. 8 allows reducing or eliminating the dependency of the loop gain on the conductivity of the switches 603 and 607. Hence, the settling time of the gain-loop becomes more reproducible and can thus be precisely set.

The examples suggested herein may in particular be based on at least one of the following solutions. In particular combinations of the following features could be utilized in order to reach a desired result. The features of the method could be combined with any feature(s) of the device or system or vice versa.

A current estimation circuitry for a converter is provided comprising:
- an integrator for integrating a voltage across an inductor of the converter,
- a current sense unit for obtaining a signal that is associated with the current flowing through at least one of the electronic switches of the converter,
- a control unit for adjusting at least two parameters of the integrator based on comparing the output of the integrator with the signal provided by the current sense unit.

Hence, advantageously, current tracking is provided that allows determining a current flowing through an inductor of a converter via the voltage across this inductor, wherein this voltage is calibrated in a closed loop in order to quickly obtain a high precision representation of the current.

In an embodiment, the converter is a DC/DC converter.

In an embodiment, the two parameters comprise at least one gain of the integrator and an offset of the integrator.

In an embodiment, the control unit is arranged for adjusting the at least two parameters of the integrator based on comparing the output of the integrator with the signal provided by the current sense unit in a closed loop.

In an embodiment, the control unit is arranged for adjusting the at least two parameters of the integrator based on comparing the output of the integrator with the signal provided by the current sense unit when this signal is valid.

In an embodiment, the signal obtained by the current sense unit is valid during a part of a switching period of an electronic switch of the converter.

Hence, the current sense unit can be masked during a time when the electronic switch is turned off. This can be achieved by short-circuiting a current sense operational amplifier. According to an example the current sense operational amplifier may be arranged to provide an output voltage that is proportional to a current flowing through the electronic switch.

In an embodiment, the electronic switch is a high-side switch or a low-side switch of the converter.

In an embodiment, the current sense unit comprises a sense cell arranged with one of the electronic switches of the inverter.

In an embodiment, the sense cell is arranged with the electronic switch of the inverter, which is in a conductive state for a longer period of time than the other electronic switch of the inverter in a typical operating mode or during runtime.

In an embodiment, the circuitry comprises a current source that drives a current through the sense cell, wherein the current source is controlled by a current sense operational amplifier.

In an embodiment, the circuitry comprises a current source that drives a current through the sense cell, wherein the current source is controlled by an output of the integrator.

In an embodiment, the at least two parameters are adjusted via a current sense operational amplifier.

Such embodiment allows for the circuit to operate at high frequencies and maintaining a suitable level of accuracy.

In an embodiment, the control unit is arranged to not adjust at least one parameter during a discontinuous conduction mode.

In an embodiment, the control unit is arranged to not adjust a gain of the integrator during a discontinuous conduction mode.

In an embodiment, the control unit is arranged to not adjust a gain of the integrator during a discontinuous conduction mode based on at least one of the following criteria:
  a length of a dead time;
  a length of the turn on time of a low-side switch; and
  a duty cycle of the turn on time of the low-side switch compared to the duration of the period.

In an embodiment, the control unit is arranged to store a gain setting obtained during a continuous conduction mode to be re-used when the converter returns from a discontinuous conduction mode to the continuous conduction mode.

In an embodiment, the integrator and/or the current sense unit comprises an array of sampling capacitors, wherein the array is divided into several regions, wherein the load stored in the regions are used for adjusting the parameters of the integrator.

In an embodiment, the control unit is arranged for
  tracking a current signal until the end of an active switching cycle of one of the electronic switches;
  storing the tracked current signal;
  determining a difference of a subsequent current signal value obtained at a subsequent active switching cycle of the same electronic switch and the previously stored tracked current signal.

This can be achieved by a track-and-hold functionality of the control unit. The tracking of the current signal may be conducted until the end of an on period of the electronic switch is reached. Then, the tracked current signal may be stored (held), e.g., digitally or via a capacitor. Next, when the current signal becomes valid, i.e. after the electronic switch has been switched on again and after the current signal reached a stable state, the previously stored current signal value can be compared with the actual current signal value. The difference can be used to adjust the gain of the integrator from cycle to cycle.

A method for current estimation for a converter is provided, the method comprising the steps:
  integrating via an integrator a voltage across an inductor of the converter,
  obtaining a signal that is associated with the current flowing through at least one of the electronic switches of the converter,
  adjusting at least two parameters of the integrator based on comparing the output of the integrator with the signal provided by the current sense unit.

In an embodiment, the two parameters comprise at least one gain of the integrator and an offset of the integrator.

In an embodiment, the method comprises the step of adjusting the at least two parameters of the integrator based on comparing the output of the integrator with the signal provided by the current sense unit in a closed loop.

In an embodiment, the method comprises the step of adjusting the at least two parameters of the integrator based on comparing the output of the integrator with the signal provided by the current sense unit when this signal is valid.

In an embodiment, the signal obtained by the current sense unit is valid during a part of a switching period of an electronic switch of the converter.

In an embodiment, the signal obtained by the current sense unit is valid during a part of a switching period of an electronic switch of the converter after a predetermined amount of time until a settling or ringing has substantially decayed.

In an embodiment, the method comprises the steps:
  starting a tracking when the signal becomes valid until the end of the valid duration;
  storing the tracked signal;
  determining a difference between a subsequent signal from a subsequent switching period and the stored signal;
  adjusting a gain of the integrator based on the difference.

In an embodiment, the method comprises the step:
  adjusting an offset of the integrator based on a difference between the signal obtained by the current sense unit when this signal is valid and the integrated voltage across the inductor provided by the integrator.

In an embodiment, the signal associated with the current flowing through at least one of the electronic switches is determined via a sense cell that is arranged with one of the electronic switches.

In an embodiment, a current through the sense cell is provided by a current source which is controlled by a current sense operational amplifier.

In an embodiment, a current through the sense cell is provided by a current source which is controlled by an output of the integrator that integrates the voltage across the inductor.

In an embodiment, the method comprises the step of not adjusting at least one parameter during a discontinuous conduction mode.

In an embodiment, the method comprises the step of not adjusting a gain parameter of the integrator during a discontinuous conduction mode.

In an embodiment, the method comprises the step of not adjusting a gain of the integrator during a discontinuous conduction mode based on at least one of the following criteria:
  a length of a dead time;
  a length of the turn on time of a low-side switch; and
  a duty cycle of the turn on time of the low-side switch compared to the duration of the period.

In an embodiment, the method comprises the step of storing a gain setting obtained during a continuous conduction mode to be re-used when the converter returns from a discontinuous conduction mode to the continuous conduction mode.

A system for current estimation for a converter is suggested, said system comprising:
  means for integrating via an integrator a voltage across an inductor of the converter,
  means for obtaining a signal that is associated with the current flowing through at least one of the electronic switches of the converter,
  means for adjusting at least two parameters of the integrator based on comparing the output of the integrator with the signal provided by the current sense unit.

A DC/DC buck converter is provided comprising a current estimation circuitry as described herein.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A current estimation circuitry for a converter, comprising:
    an integrator for integrating a voltage across an inductor of the converter,
    a current sense unit for obtaining a signal that is associated with the current flowing through at least one of electronic switches of the converter,
    a control unit for adjusting at least two parameters of the integrator based on comparing an output of the integrator with the signal provided by the current sense unit.

2. The circuitry according to claim 1, wherein the converter is a DC/DC converter.

3. The circuitry according to claim 1, wherein the at least two parameters comprise at least one gain of the integrator and an offset of the integrator.

4. The circuitry according to claim 1, wherein the control unit is arranged for adjusting the at least two parameters of the integrator based on comparing the output of the integrator with a signal provided by the current sense unit in a closed loop.

5. The circuitry according to claim 1, wherein the control unit is arranged for adjusting the at least two parameters of the integrator based on comparing the output of the integrator with a signal provided by the current sense unit when this signal is valid.

6. The circuitry according to claim 5, wherein the signal obtained by the current sense unit is valid during a part of a switching period of an electronic switch of the converter.

7. The circuitry according to claim 6, wherein the electronic switch is a high-side switch or a low-side switch of the converter.

8. The circuitry according to claim 1, wherein the current sense unit comprises a sense cell arranged with one of the electronic switches of the converter.

9. The circuitry according to claim 8, wherein the sense cell is arranged with the electronic switch of the converter, which is in a conductive state for a longer period of time than an other electronic switch of the converter in a typical operating mode or during runtime.

10. The circuitry according to claim 8, comprising a current source that drives a current through the sense cell, wherein the current source is controlled by a current sense operational amplifier.

11. The circuitry according to claim 8, comprising a current source that drives a current through the sense cell, wherein the current source is controlled by an output of the integrator.

12. The circuitry according to claim 11, wherein the at least two parameters are adjusted via a current sense operational amplifier.

13. The circuitry according to claim 1, wherein the control unit is arranged to not adjust at least one parameter during a discontinuous conduction mode.

14. The circuitry according to claim 1, wherein the control unit is arranged to not adjust a gain of the integrator during a discontinuous conduction mode.

15. The circuitry according to claim 1, wherein the control unit is arranged to not adjust a gain of the integrator during a discontinuous conduction mode based on at least one of the following criteria:
    a length of a dead time;
    a length of a turn on time of a low-side switch; and
    a duty cycle of the turn on time of the low-side switch compared to a duration of a period.

16. The circuitry according to claim 1, wherein the control unit is arranged to store a gain setting obtained during a continuous conduction mode to be reused when the converter returns from a discontinuous conduction mode to the continuous conduction mode.

17. The circuitry according to claim 1, wherein the integrator and/or the current sense unit comprises an array of sampling capacitors, wherein the array is divided into several regions, wherein a load stored in the regions are used for adjusting the parameters of the integrator.

18. The circuitry according to claim 1, wherein the control unit is arranged for
    tracking a current signal until an end of an active switching cycle of one of the electronic switches;
    storing the tracked current signal; and
    determining a difference of a subsequent current signal value obtained at a subsequent active switching cycle of the same electronic switch and the previously stored tracked current signal.

19. A method for current estimation for a converter, comprising:
    integrating via an integrator a voltage across an inductor of the converter,
    obtaining a signal that is associated with the current flowing through at least one of electronic switches of the converter,
    adjusting at least two parameters of the integrator based on comparing an output of the integrator with a signal provided by a current sense unit.

20. The method according to claim 19, wherein the two parameters comprise at least one gain of the integrator and an offset of the integrator.

21. The method according to claim 19, comprising adjusting the at least two parameters of the integrator based on comparing an output of the integrator with the signal provided by the current sense unit in a closed loop.

22. The method according to claim 19, comprising adjusting the at least two parameters of the integrator based on comparing an output of the integrator with the signal provided by the current sense unit when this signal is valid.

23. The method according to claim 22, wherein the signal obtained by the current sense unit is valid during a part of a switching period of an electronic switch of the converter.

24. The method according to claim 22, wherein the signal obtained by the current sense unit is valid during a part of a switching period of an electronic switch of the converter after a predetermined amount of time until a settling or ringing has substantially decayed.

25. The method according to claim 24, comprising:
    starting a tracking when the signal becomes valid until an end of the valid part of the switching period;
    storing the tracked signal;
    determining a difference between a subsequent signal from a subsequent switching period and the stored signal; and
    adjusting a gain of the integrator based on the difference.

26. The method according to claim 24, comprising:
adjusting an offset of the integrator based on a difference between the signal obtained by the current sense unit when this signal is valid and the integrated voltage across the inductor provided by the integrator.

27. The method according to claim 19, wherein the signal associated with the current flowing through at least one of the electronic switches is determined via a sense cell that is arranged with one of the electronic switches.

28. The method according to claim 27, wherein a current through the sense cell is provided by a current source which is controlled by a current sense operational amplifier.

29. The method according to claim 27, wherein a current through the sense cell is provided by a current source which is controlled by an output of the integrator that integrates the voltage across the inductor.

30. The method according to claim 19, comprising not adjusting at least one parameter during a discontinuous conduction mode.

31. The method according to claim 19, comprising not adjusting a gain parameter of the integrator during a discontinuous conduction mode.

32. The method according to claim 19, comprising not adjusting a gain of the integrator during a discontinuous conduction mode based on at least one of the following criteria:
a length of a dead time;
a length of a turn on time of a low-side switch; and
a duty cycle of the turn on time of the low-side switch compared to a duration of a period.

33. The method according to claim 19, comprising storing a gain setting obtained during a continuous conduction mode to be reused when the converter returns from a discontinuous conduction mode to the continuous conduction mode.

34. A system for current estimation for a converter, comprising:
means for integrating via an integrator a voltage across an inductor of the converter,
means for obtaining a signal that is associated with the current flowing through at least one of electronic switches of the converter,
means for adjusting at least two parameters of the integrator based on comparing an output of the integrator with the signal provided by a current sense unit.

35. A DC/DC buck converter comprising a current estimation circuitry according to claim 1.

* * * * *